Dec. 25, 1923.
C. F. MATTINGLY
AUTOMATIC FOUNTAIN VALVE
Filed July 18, 1921
1,478,669
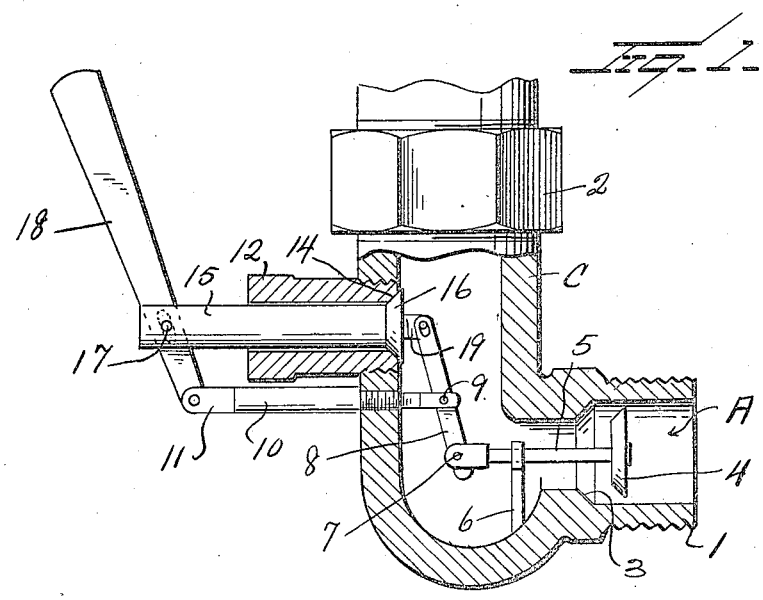
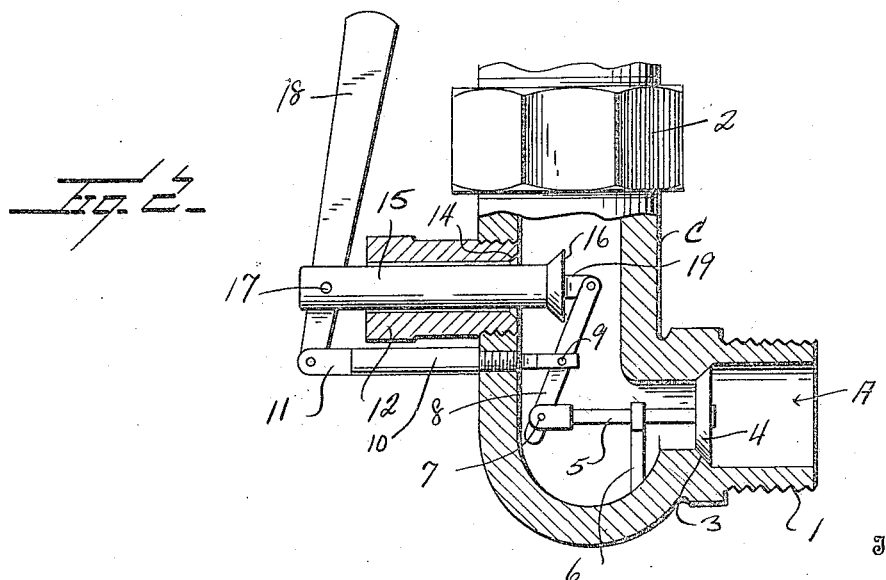
Inventor
C. F. Mattingly
By Watson E. Coleman
Attorney Patented Dec. 25, 1923.

1,478,669

UNITED STATES PATENT OFFICE.

CHARLES F. MATTINGLY, OF ST. LOUIS, MISSOURI, ASSIGNOR TO MATTINGLY AUTOMATIC VALVE CO., OF ST. LOUIS, MISSOURI, A CORPORATION OF MISSOURI.

AUTOMATIC FOUNTAIN VALVE.

Application filed July 18, 1921. Serial No. 485,623.

*To all whom it may concern:*

Be it known that I, CHARLES F. MATTINGLY, a citizen of the United States, residing at St. Louis, in the State of Missouri, have invented certain new and useful Improvements in Automatic Fountain Valves, of which the following is a specification, reference being had to the accompanying drawings.

This invention relates to certain improvements in automatic fountain valves and it is an object of the invention to provide a novel and improved device of this general character embodying a pressure chamber, together with means whereby the valve is automatically caused to close upon reduction of pressure within said chamber.

Another object of the invention is to provide a novel and improved device of this general character including a casing adapted for connection with a source of fluid under pressure and which includes a pressure chamber, together with a valve normally maintained in open position under the influence of the pressure within the chamber, said valve automatically moving into closed position upon reduction of such pressure.

Furthermore, it is an object of the invention to provide a novel and improved device of this general character including a casing adapted for communication with a source of fluid under pressure and embodying a pressure chamber, together with a valve within said casing and normally maintained open under the influence of the pressure within the chamber, said valve moving into closed position upon reduction of such pressure, and wherein means are provided to further reduce the pressure within the chamber to facilitate the closing movement of the valve.

The invention consists in the details of construction and in the combination and arrangement of the several parts of my improved automatic fountain valve whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be better understood, I will now proceed to describe the same with reference to the accompanying drawings, wherein:

Figure 1 is a view partly in section and partly in elevation of an automatic fountain valve constructed in accordance with an embodiment of my invention; and Figure 2 is a view similar to Figure 1 but showing certain of the parts in a second position.

As disclosed in the accompanying drawings, C denotes a casing, herein disclosed as substantially L-shaped in form, and which has one end portion 1 threaded so that the same may be suitably connected or coupled to a reservoir, boiler or other source of fluid under pressure. The opposite end portion of the casing C is provided with a union nut or coupling 2 adapted for coaction with a pipe, hose or other conduit.

The end portion of the casing C provided with the threads 1, or the foot of the casing, is provided with an internal main valve seat 3 with which coacts a main valve 4. The main valve 4 is fixed to an end portion of a valve stem 5, said valve stem 5 being slidably disposed through a guide 6 arranged within the bore of the casing C and at a point inwardly of the valve seat 3.

The opposite or inner end portion of the stem 5 is pivotally engaged, as at 7, with an end portion of a link 8, the central portion of said link being pivotally engaged, as at 9, with an end portion of a shank 10 extending inwardly of the casing. The shank 10 is threaded through a wall of the casing C and extends a predetermined distance outwardly thereof and terminates in a head 11.

Threaded into the wall of the casing C outwardly of the shank 1, is a tubular plug 12, the inner end of which is provided with a valve seat 14. The bore of the plug 12 provides a port communicating with the bore or passageway of the casing C at a point inwardly of the internal valve seat 3. Slidably disposed through the plug 12 is a valve stem 15 which extends inwardly of the casing C and is provided at said extended end portion with a valve 16 which coacts with the valve seat 14. The stem 15 extends outwardly from the plug 12 and has pivotally engaged therewith, as at 17, an operating lever 18, said lever 18 being also pivotally engaged with the head 11 of the shank 10.

The inner end portion of the stem 15 is provided with a lug or ear 19 with which is pivotally engaged the link 8 hereinbefore referred to so that upon movement of the lever 18 in one direction, the valve 4 will be moved into closed position and the valve 16 into open position and vice versa. The valve 4 is moved into open position by pulling outwardly upon the outer end portion of the operating lever 18 and which action causes the auxiliary valve 16 to move into closed position, said valves 4 and 16 moving in unison but in reverse directions.

When the valve 4 is in open position, the fluid under pressure passes from the chamber A around the valve 4 and through the bore or passageway of the casing to the pipe line, hose or other conduit. The pressure in the pipe line or the like will quickly equalize with the pressure in the chamber A and will at the same time exert its pressure on the inner side of the auxiliary valve 16, holding it snugly to its seat and thereby preventing pressure or fluid from escaping around the valve stem 15.

The area around the valve 4 is so proportioned that it permits sufficient fluid under presure to pass therearound to operate any machine or device which may be associated with the casing C and at the same time maintains in the bore or passageway of the casing C a pressure equal to that in the chamber A. Should the pipe, hose or other conduit burst or rupture, the pressure in the bore or passageway of the casing C will be quickly reduced below that in the chamber A. This will cause the pressure in the chamber A to rush or press against the valve 4 moving it toward its seat 3 and through the instrumentality of the link 8 will move the auxiliary valve 16 into open position. With the valve 16 in open position, the fluid under pressure is permitted to pass out around the valve stem 15 resulting in a greater reduction of pressure in the bore or passageway of the casing C so that the automatic moving of the valve 4 to its seat or into closed position is materially facilitated so that the valve 4 will shut off all of the fluid under pressure from the reservoir, boiler or other source of supply.

From the foregoing description it is thought to be obvious that an automatic fountain valve constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

A valve of the class described comprising a casing adapted for communication with a source of fluid under pressure, the bore of said casing being provided with an internal valve seat, the portion of the bore at the induction side of the valve seat constituting a pressure chamber, a wall of the casing being provided with a port in communication with the bore of the casing outwardly of the internal valve seat, a valve coacting with the internal valve seat, a valve coacting with the port, a link arranged within the casing and operatively supported between its ends, an inwardly directed stem carried by the first named valve and pivotally engaged with an end portion of the link, the opposite end portion of the link being pivotally connected with the second named valve, a stem for the second named valve extending outwardly of the casing through the port, and means exterior of the casing engaged with the stem of the second named valve for operating both of the valves.

In testimony whereof I hereunto affix my signature.

CHARLES F. MATTINGLY.